July 29, 1958 P. GUNKLER ET AL 2,845,556
COMMUTATOR
Filed July 21, 1955
FIG. 1
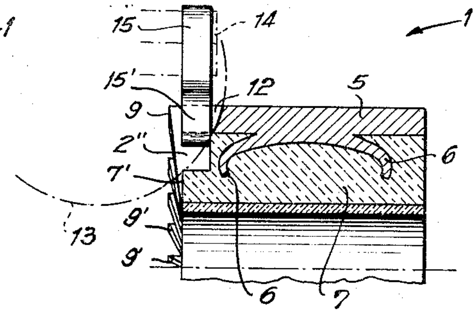
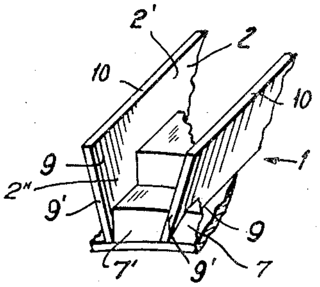
FIG. 3
FIG. 2
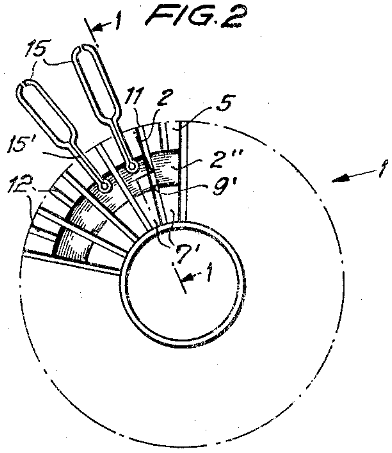
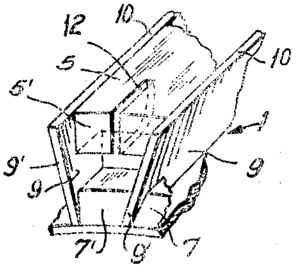
FIG. 4
FIG. 5
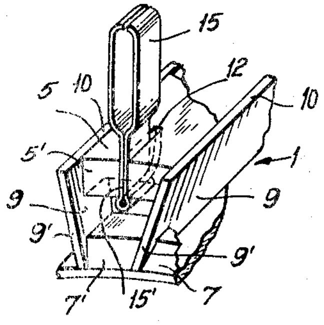
INVENTORS:
Paul Gunkler,
Friedrich Vollmer
Wilhelm Kugel
by:
Michael S. Striker
Att.

United States Patent Office 2,845,556
Patented July 29, 1958

2,845,556

COMMUTATOR

Paul Gunkler and Friedrich Vollmer, Stuttgart-Zuffenhausen, and Wilhelm Kugel, Stuttgart-Feuerbach, Germany, assignors to Robert Bosch G. m. b. H., Stuttgart, Germany Application July 21, 1955, Serial No. 523,510

Claims priority, application Germany July 22, 1954

6 Claims. (Cl. 310—234)

The present invention relates to commutators.

More particularly, the present invention relates to a commutator which may be constructed in an extremely simple manner.

Known commutators are provided with a plurality of commutator segments, each of which is provided with a suitable electrical conductor by means of which each segment is electrically connected to the rotor winding. These conductors are usually first mechanically connected to the commutator segments and are thereafter dip soldered or dip brazed to the segments. This procedure often results in the formation of conductive strands or bridges between individual commutator segments, thereby destroying the utility of the commutator.

It is therefore an object of the present invention to provide a commutator wherein electrical connectors are connected to the individual commutator segments in such a manner that the conductors may be dip soldered or dip brazed without there being formed undesirable conductive strands or bridges between the individual commutator segments.

It is another object of the present invention to provide a commutator which may be constructed at very low cost.

The objects of the present invention also include the provision of a commutator which comprises a minimum number of parts, each of which may be mass produced extremely economically, thereby further reducing the total cost of construction.

With the above objects in view, the present invention mainly consists in a commutator which comprises a substantially cylindrical body member and a plurality of commutator means mounted thereon. The body member has opposite end faces and is of a first diameter throughout a first portion of its length extending from one of the end faces to a region near to but spaced from the other of the end faces and of a second diameter smaller than the first diameter throughout the remaining portion of its length from this region to the other end face. A plurality of first elongated radial partition means are provided on the body member and extend throughout the first portion of its length, the first partition means form between themselves a plurality of elongated recesses. A plurality of second radial partition means are also provided on the body member and extend throughout the remaining portion of its length. The second partition means are in alignment with the first partition means, respectively, and form between themselves a plurality of radial recesses in alignment with the elongated recesses, respectively, so that each set of aligned elongated and radial recesses constitutes a substantially L-shaped composite recess the long portion of which is formed by the elongated recess and the short portion of which is formed by the radial recess and which substantially L-shaped composite recess is formed between two substantially L-shaped composite partitions each of which is constituted by one of the first partition means and the second partition means in alignment therewith. If desired, the body member and the plurality of first and second partition means may be integral with each other.

Each of the commutator means includes an elongated commutator segment on the outer periphery of the body member and in one of the elongated recesses thereof. The segment has an end portion projecting into the corresponding radial recess and partly fills the same. The free end face of the end portion is inwardly spaced from the free end faces of the second partition means which bound the corresponding radial recess. Also, the end portion of the segment is formed with radial slot means in communication, at its inner portion, with a part of the corresponding radial recess which is unoccupied by the end portion of the segment. A connecting member having a connecting portion is provided, which connecting portion is arranged within the corresponding radial recess. A part of the connecting portion is received by the slot means of the end portion of the segment, and another part of a connecting portion projects into the abovementioned part of the corresponding radial recess. Joining means are provided for joining the connecting portion of the connecting member to the segment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional view of a preferred embodiment of the present invention taken substantially along line I—I of Fig. 2;

Fig. 2 is an end view of the embodiment illustrated in Fig. 1;

Fig. 3 is a fragmentary perspective view of a structural element incorporated in the present invention;

Fig. 4 is a fragmentary perspective view of a partially assembled commutator according to the present invention; and Fig. 5 is a fragmentary perspective view of an assembled commutator according to the present invention, and corresponds to Figs. 1 and 2.

Referring now to the drawing, there is shown a commutator 1 which includes an elongated, substantially cylindrical body member 7 which is formed with a plurality of substantially L-shaped recesses 2 the long portion of each of which is constituted by an elongated slot 2′ and the short portion of each of which is constituted by a radial recess 2″, as may best be seen in Fig. 3. The elongated recess 2′ is bounded by two elongated radial partitions 10 and the radial recess 2″ is bounded by two radial partition means 9. Each partition 10 together with its corresponding partition 9 forms a substantially L-shaped composite partition, two adjacent ones of which bound each L-shaped composite recess 2.

The free end faces 9′ of the partitions 9 are preferably not coplanar with the free end face 7′ of the body member 7 but project outwardly therefrom, for a purpose set forth below. The preferred configuration of the partitions 9 is clearly shown in the drawing.

The body member 7 is preferably made of any suitable molded plastic, and in the illustrated embodiment, the partitions 9 and 10 are formed integral with each other and the body member 7.

An elongated commutator segment 5 is arranged in each elongated recess 2′ and has an end portion which projects into that portion of the composite L-shaped recess 2 which is common to the portions 2′ and 2″. The commutator segment 5 may be formed with suitable hooks 6 by means of which the segments may be solidly anchored within the body member 7.

The end portion of each segment is formed with a radial slot 12 which is in communication with that portion of the radial recess 2' which is not occupied by the end portion of the segment 5. This slot may be formed by a cutting tool, for example, a disc-shaped tool indicated by dotted line 13.

The slot 12 constitutes a receiving portion which is adapted to receive a connecting portion 15' of an electrical conductor member 15, as is shown in Figs. 1, 2 and 5. A part of the connecting portion 15' projects into that part of the recess 2' which is not occupied by the end portion of the segment 5.

The electrical conductor 15 is formed with an eye portion which is adapted to encompass lead 14 of a rotor winding forming part of the rotor with which the commutator is associated.

The conductors 15 are dip soldered or dip brazed so as firmly to connect or join these conductors to the commutator segments 5. Accordingly, the free end faces 9' project beyond the end faces 5' of the end portions of the segments 5 so that the formation of conductive strands of bridges between adjacent commutator segments 5 is prevented during such dip soldering or dip brazing.

The projecting portions of the partitions 9 also facilitate the guiding of the cutting tool 13 which cuts the slots 12. Moreover, the arrangement of the parts is such that the cutting tool is called upon to work only the commutator segments 5 without cutting the material of the body member 7.

It will be understood that each of the elements described above, or two or more together, may also find a useful application in other types of commutators differing from the types described above.

While the invention has been illustrated and described as embodied in a commutator which is assembled by dip soldering or dip brazing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A commutator comprising, in combination, a substantially cylindrical body member having an end face formed with an annular recess and with a plurality of radially extending partitions subdividing said recess into a plurality of spaced sectoral recesses; and a plurality of commutator means, each including an elongated commutator segment on the outer periphery of said body member, extending in axial direction in radial alignment with one of said sectoral recesses and having an end portion projecting thereinto and but partly filling the same in its portion more remote from the commutator axis, said end portion being formed with opening means in communication with that part of said recess which is unoccupied by said end portion of said segment, a connecting member having a connecting portion arranged within said recess, a part of said connecting portion being received by said opening means of said end portion of said segment and another part of said connecting portion projecting radially into said part of said recess towards said axis, and joining means for joining said connecting portion of said connecting member to said segment.

2. A commutator comprising, in combination, a substantially cylindrical body member having an end face formed with an annular recess and with a plurality of radially extending partitions subdividing said recess into a plurality of spaced sectoral recesses; and a plurality of commutator means, each including an elongated commutator segment on the outer periphery of said body member, extending in axial direction in radial alignment with one of said sectoral recesses and having an end portion projecting thereinto and but partly filling the same in its portion more remote from the commutator axis, said end portion being formed with radial slot means in communication with that part of said recess which is unoccupied by said end portion of said segment, a connecting member having a connecting portion arranged within said recess, a part of said connecting portion being received by said radial slot means of said end portion of said segment and another part of said connecting portion projecting radially into said part of said recess towards said axis, and joining means for joining said connecting portion of said connecting member to said segment.

3. A commutator comprising, in combination, an elongated substantially cylindrical body member formed with a plurality of spaced substantially L-shaped recesses having long and short portions and including radial partitions separating said recesses, said long portions extending in axial direction along the outer surface of said cylindrical body member and said short portions extending in radial direction in the region of an end face of said body member; and a plurality of commutator means, each including an elongated commutator segment in the long portion of one of said recesses and having an end portion filling only that portion of said one recess which is common to its long and short portions, said end portion being formed with a radial slot in communication with the short portion of said one recess, a connecting member having a connecting portion a part of which is received within said radial slot and another part of which projects radially into the short portion of said one recess, and joining means for joining said connecting portion of said connecting member to said segment.

4. A commutator comprising, in combination, a substantially cylindrical body member having opposite end faces and being of a first diameter throughout a first portion of its length extending from one of said end faces to a region near to but spaced from the other of said end faces and of a second diameter smaller than said first diameter throughout the remaining portion of its length extending from said region to said other end face; a plurality of first elongated radial partition means on said body member and extending throughout said first portion of its length, said first partition means forming between themselves a plurality of elongated recesses; a plurality of second radial partition means on said body member and extending throughout said remaining portion of its length, said second partition means being in alignment with said first partition means, respectively, and forming between themselves a plurality of radial recesses in alignment with said elongated recesses, respectively, so that each set of aligned elongated and radial recesses constitutes a substantially L-shaped composite recess the long portion of which is formed by the elongated recess and the short portion of which is formed by the radial recess and which substantially L-shaped composite recess is formed between two substantially L-shaped composite partitions, each of which is constituted by one of said first partition means and the second partition means in alignment therewith; and a plurality of commutator means, each including an elongated commutator segment in one of said elongated recesses and having an end portion projecting into the corresponding radial recess and filling but that portion thereof which is an extension of said elongated recess, said end portion being formed with receiving means, a connecting member having a connecting portion arranged within said corresponding radial recess, at least a part of said connecting portion being received by said receiving means of said end portion of said segment, and joining means for joining said connecting portion of said connecting member to said segment.

5. A commutator comprising, in combination, a substantially cylindrical body member having opposite end faces and being of a first diameter throughout a first portion of its length extending from one of said end faces to a region near to but spaced from the other of said end faces and of a second diameter smaller than said first diameter throughout the remaining portion of its length extending from said region to said other end face; a plurality of first elongated radial partition means on said body member and extending throughout said first portion of its length, said first partition means forming between themselves a plurality of elongated recesses; a plurality of second radial partition means on said body member and extending throughout said remaining portion of its length, said second partition means being in alignment with said first partition means, respectively, and forming between themselves a plurality of radial recesses in alignment with said elongated recesses, respectively, so that each set of aligned elongated and radial recesses constitutes a substantially L-shaped composite recess the long portion of which is formed by the elongated recess and the short portion of which is formed by the radial recess and which substantially L-shaped composite recess is formed between two substantially L-shaped composite partitions, each of which is constituted by one of said first partition means and the second partition means in alignment therewith; and a plurality of commutator means, each including an elongated commutator segment in one of said elongated recesses and having an end portion projecting into the corresponding radial recess and partly filling the same, the free end face of said end portion being inwardly spaced from the free end faces of the second partition means bounding said corresponding radial recess, said end portion being formed with radial slot means in communication at its inner portion with a part of said corresponding radial recess which is unoccupied by said end portion of said segment, a connecting member having a connecting portion arranged within said corresponding radial recess, a part of said connecting portion being received by said radial slot means of said end portion of said segment and another part of said connecting portion projecting into said part of said corresponding radial recess, and joining means for joining said connecting portion of said connecting member to said segment.

6. In a commutator, in combination, a substantially cylindrical body member having opposite end faces and being of a first diameter throughout a first portion of its length extending from one of said end faces to a region near to but spaced from the other of said end faces and of a second diameter smaller than said first diameter throughout the remaining portion of its length extending from said region to said other end face; a plurality of first elongated radial partition means on said body member and extending throughout said first portion of its length, said first partition means forming between themselves a plurality of elongated recesses; a plurality of second radial partition means on said body member and extending throughout said remaining portion of its length, said second partition means being in alignment with said first partition means, respectively, and forming between themselves a plurality of radial recesses in alignment with said elongated recesses, respectively, so that each set of elongated and radial recesses constitutes a substantially L-shaped composite recess the long portion of which is formed by the elongated recess and the short portion of which is formed by the radial recess and which substantially L-shaped composite recess is formed between two substantially L-shaped composite partitions, each of which is constituted by one of said first partition means and the second partition means in alignment therewith; and a plurality of commutator means, each including an elongated commutator segment in one of said elongated recesses and having an end portion projecting into the corresponding radial recess and filling but that portion thereof which is an extension of said elongated recess, said first and second diameters of said body member being so selected that a circular cutting tool of predetermined diameter may be utilized to cut a radial slot into said end portion of each segment without cutting said body member.

References Cited in the file of this patent

UNITED STATES PATENTS

| | | |
|---|---|---|
| 1,287,309 | Hensley | Dec. 10, 1918 |
| 1,357,016 | Zimmerman | Oct. 26, 1920 |

FOREIGN PATENTS

| | | |
|---|---|---|
| 144,405 | Switzerland | Mar. 2, 1931 |
| 539,175 | France | Mar. 29, 1922 |